United States Patent

Shannon

[11] Patent Number: 5,972,251
[45] Date of Patent: Oct. 26, 1999

[54] METHOD FOR BLOCKING A CONTACT LENS BUTTON

[75] Inventor: John H. Shannon, Hamlin, N.Y.

[73] Assignee: Bausch & Lomb Incorporated, Rochester, N.Y.

[21] Appl. No.: 08/941,719

[22] Filed: Oct. 1, 1997

Related U.S. Application Data

[60] Provisional application No. 60/028,967, Oct. 16, 1996.

[51] Int. Cl.⁶ .................................................. B29D 11/00
[52] U.S. Cl. .......................... 264/1.7; 264/2.7; 264/163; 425/808; 451/42; 451/390
[58] Field of Search ................................ 264/1.7, 2.5, 2.7, 264/138, 162, 163; 425/808; 451/42, 390

[56] References Cited

U.S. PATENT DOCUMENTS

| | | |
|---|---|---|
| 3,030,859 | 4/1962 | Elliott, Jr. . |
| 3,032,936 | 5/1962 | Voice . |
| 3,100,955 | 8/1963 | Kratt . |
| 3,773,868 | 11/1973 | Bronstein . |
| 3,909,982 | 10/1975 | Schlotfeldt . |
| 4,089,102 | 5/1978 | Soper et al. ............................. 425/808 |
| 4,434,581 | 3/1984 | Spriggs . |
| 4,455,901 | 6/1984 | Council, Jr. . |
| 4,460,275 | 7/1984 | Spriggs ................................... 356/358 |
| 4,478,770 | 10/1984 | Vofsi et al. ............................. 425/808 |
| 4,502,909 | 3/1985 | Tomesko ................................. 156/356 |
| 4,520,596 | 6/1985 | Otto et al. . |
| 4,653,234 | 3/1987 | Lombard . |
| 4,686,798 | 8/1987 | Petty et al. . |
| 4,745,672 | 5/1988 | Sealey et al. ............................ 29/558 |
| 4,921,205 | 5/1990 | Drew, Jr. et al. ....................... 249/61 |
| 4,980,993 | 1/1991 | Umezaki . |
| 5,110,278 | 5/1992 | Tait et al. ............................... 425/175 |
| 5,115,553 | 5/1992 | Sealey et al. ............................ 29/563 |
| 5,137,441 | 8/1992 | Fogarty ................................... 264/1.1 |
| 5,648,025 | 7/1997 | Cook et al. ............................. 264/1.38 |
| 5,669,807 | 9/1997 | Moreau et al. .......................... 451/42 |

FOREIGN PATENT DOCUMENTS

| | | |
|---|---|---|
| 0140484 | 5/1985 | European Pat. Off. . |
| 0488626A2 | 6/1992 | European Pat. Off. . |
| 3218766A1 | 1/1983 | Germany . |
| 94/08788 | 4/1994 | WIPO . |

*Primary Examiner*—Mathieu D. Vargot
*Attorney, Agent, or Firm*—Katherine McGuire; John E. Thomas

[57] ABSTRACT

A contact lens button and a block are integrally formed together when the contact lens button is cast in a cup having an aperture formed in the center of the bottom wall of the cup. The block has a first elongated end forming a spindle and a second end which is of circular, generally planar configuration. The spindle end is inserted through the aperture in the bottom wall of the cup providing an interference fit with the circular end portion located inside the cup spaced parallel to and slightly upwardly from the bottom wall, and the first spindle end extends exteriorly of the cup. A quantity of liquid lens material is dispensed into the cup, completely surrounding the circular end portion of the block. The material cures around the block second end, with the formed button and block removable from the cup as a single unit. The block first end is secured to a lathe chuck for rotating the button to cut the concave base surface of the lens. A front curve block is then removably secured to the base curve surface and inserted into a lathe chuck for cutting the convex power curve into the button while previously or simultaneously cutting away the block. The block sets the turning axis of the button and assists in transferring the turning axis over to the front curve block.

21 Claims, 4 Drawing Sheets

METHOD FOR BLOCKING A CONTACT LENS BUTTON

This application claims the benefit of U.S. Provisional Application No.: 60/028,967 filed on Oct. 16, 1996.

BACKGROUND OF THE INVENTION

The present invention relates to contact lens manufacturing, and more particularly relates to improved apparatus and methods for blocking a contact lens button (also termed a contact lens blank or precursor) for machining operations which form the button into a wearable contact lens.

One common method of manufacturing contact lenses is lathing the lens from a cylindrical contact lens button. Contact lens buttons may be cut from rod stock or sheet material, or individually cast in cups using a curable liquid monomer. While it is possible to attach the button directly to the lathe chuck, this is not commonly done since the chuck of the lathe machine uses radial compression to hold the work piece in place for lathing, and as such could impart damaging forces to the optical characteristics of the button. The button is therefore more commonly mounted to one end of a separate metal pin or "block", the opposite end of the block being configured as a spindle for removable insertion into the chuck of the lathe. The button is typically adhered to the block with an adhesive or special type of wax called "pitch" (with the block thus commonly referred to as a "pitch block" in the art). While the block and button are turned, a concave (or "base") curve is lathed into the exposed end of the button opposite the adhered end. While still attached to the chuck and rotating, a second "ledge" cut may be made in the outer cylindrical surface of the button for facilitating subsequent alignment with the front curve block, this cut typically termed a "base curve reference". A "front curve" block is then removably secured to the lathed base curve surface while attempting to maintain axial alignment with the first "base curve" block which is then removed from the button. The front curve block is mounted to the lathe chuck for lathing the convex or front curve of the button to form the finished lens. Lens edging and polishing operations may also be performed on each surface of the lens prior to removal from each block.

The multiple mounting and removal operations of the button to and from the blocks during the entire lathing process consumes a significant amount of time and is prone to error, especially in maintaining the necessary axial alignment between the base curve block and the front curve block. If precise axial alignment between the base and front curve blocks is not maintained, an undesired prism may be introduced to the resultant lens which must then be scrapped. Also, removal of the base curve block prior to lathing the front curve of the lens sometimes requires the use of heat or mechanical force, another added cost to the manufacturing process.

SUMMARY OF THE INVENTION

The present invention addresses the above problems with blocking a molded contact lens button by providing a block which may be integrally formed with a contact lens button when the button is molded in a casting cup. Since the block is formed integrally with the button when the button is made, there is no need for a separate blocking operation of the button to a base curve block as is now widely practiced in this art as discussed above. Furthermore, since the block is made of a machinable material, there is no need for removing the block from the button prior to lathing the front curve since the machinable base curve block is cut away immediately prior to or simultaneous with cutting of the front curve of the lens.

The block of the invention is preferably formed from a material which is readily machinable, e.g., a dimensionally stable resin such as polystyrene. The block is basically comprised of two portions; a flat, circular carrier member to which a contact lens button attaches in the manner to be explained, and an elongated spindle extending from the center of the bottom surface of the carrier member, the opposite, free end of the spindle configured for removable attachment to the lathe chuck.

The block is secured to the button when the button is made. More particularly, a casting cup is provided which is of generally cylindrical configuration having a bottom wall with a cylindrical side wall extending upwardly from the perimeter of the bottom wall, the upper perimeter of the cylindrical wall defining a top opening wherein liquid monomer may be poured into the cup. A circular aperture is formed through substantially the center of the bottom wall wherethrough the free end of the spindle of the machinable base curve block of the invention is passed from the top opening of the cup. In the fully inserted position of the block within the cup, the circular carrier member of the block is also located within the casting cup, and preferably within the lower half of the cup.

With the block thus firmly attached to the casting cup, a quantity of liquid monomer is dispensed into the cup to form the button. To further increase the mechanical connection between the block and the button, the circular carrier member may be provided with a plurality of through holes arranged in annularly spaced relation thereabout such that the monomer flows through and occupies the space of the through holes. Also, the carrier member is preferably spaced from the bottom wall of the cup such that the liquid monomer also flows on both sides of the carrier member. It is noted the diameter of the aperture in the cup bottom wall is only very slightly larger than the diameter of the spindle section passing therethrough such that there is an interference fit between the two when the spindle is passed through the aperture. As such, leakage of the liquid monomer from the cup through the aperture is substantially prevented. Once the monomer is dispensed in the cup, it is allowed to cure to form a hard polymeric button, with both the button and block being removable from the cup as a single unit.

The axis about which the button will be turned in a lathe is defined by the spindle portion of the block. Since the spindle extends through a centrally located aperture in the casting cup, the portion of the spindle extending from the formed button lies substantially along the central axis of the cylindrical button. The free end of the spindle opposite the button may then be inserted into the chuck of a lathe for cutting the first base curve into the exposed end of the button. Once the base curve is cut, a front curve block may be adhered to the base curve surface which is done while maintaining axial alignment between the front curve block and the spindle.

With the front curve block thus secured to the base curve surface of the button, the free end of the front curve block is attached to the chuck of a lathe for cutting the front, "power" curve of the lens. As discussed, the base curve block is machinable so it need not be removed from the button prior to cutting the front curve. Instead, the base curve block is simply cut away by the cutting blade either prior to or simultaneously with cutting of the front curve.

This cut into the button is of a depth sufficient to cut away the circular carrier member which was formed integrally with the button in the cup.

It is noted that prior to mounting the front curve block, a measurement is made of the distance from the center of the base curve surface to a predetermined point along the spindle. Once the front curve block is adhered to the base curve surface of the button and chucked to the lathe, a second measurement is taken between the predetermined point on the spindle of the base curve block and the stop of the chuck (which is readily determinable with a chuck known in the art as a "dead stop" chuck which includes a stop which limits the movement of the front curve block spindle into the chuck). This second measurement of course includes the front curve block and thickness of the pitch used to adhere the front curve block to the button. As such, the base curve position can be readily determined by subtracting the first measurement from the second measurement, and thereby allowing the lathe to be set to cut the power curve to the desired thickness. Once the power curve is cut, the front curve block is removed from the chuck and the finished lens by known methods. It is noted intermediate lens edging and polishing operations may be performed prior to removal of the lens from each of the blocks.

DETAILED DESCRIPTION OF VARIOUS PREFERRED EMBODIMENTS

Figure 1:
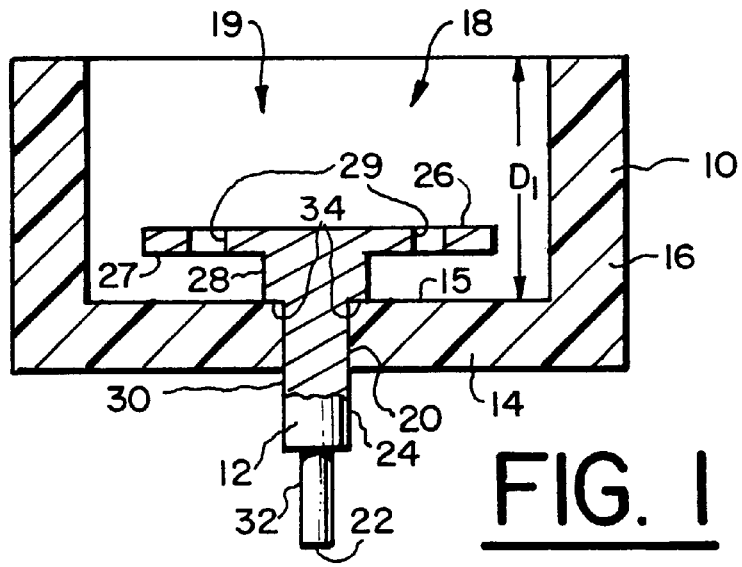
FIG. 1 is a side elevational view in section of the casting cup and base curve block of the invention in the attached condition according to a first preferred embodiment.
Figure 2:
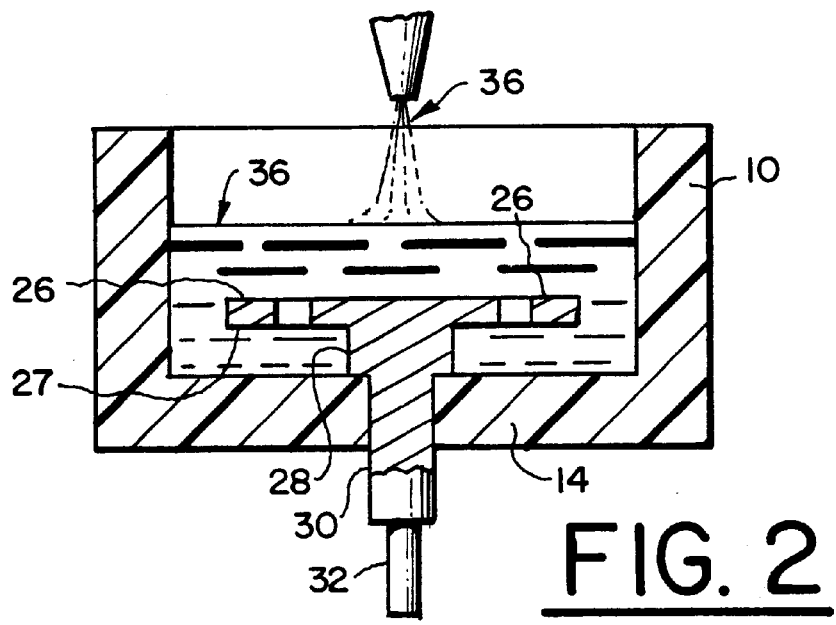
FIG. 2 is the view of FIG. 1 showing liquid monomer being dispensed within the cup.

Referring now to the drawing figures, there is seen in FIGS. 1 and 2 a casting cup 10 and machinable base curve block 12. Cup 10 includes a generally circular bottom wall 14 and a cylindrical side wall 16 extending upwardly therefrom defining an open top 18. An aperture 20 is formed entirely through substantially the center of bottom wall 14, through which the free end 22 of spindle portion 24 of the base curve block 12 is passed from open top 18 to attach block 12 to cup 10.

Base curve block 12 is machinable as described so that block 12 can be cut completely away prior to or simultaneously with the power curve cutting operation (as will be described more fully below). A suitable material for base curve block 12 is a dimensionally stable resin such as polystyrene, for example. It is intended cup 10 be disposable and formed of a resin which is compatible with liquid lens material; a suitable material for cup 10 would be polypropylene, for example.

Base curve block 12 is comprised of two main portions; a spindle portion 24 and an integral circular carrier portion 26, with spindle portion 24 perpendicularly extending from substantially the center of the bottom surface 27 thereof. Spindle 24 could be made of a constant diameter along its total length; however, in the preferred embodiment, spindle 24 is configured with three sections 28, 30 and 32 of increasingly reduced diameter from bottom surface 27 to the spindle free end 22, respectively. The diameter of center section 24 is only very slightly smaller than the diameter of aperture 20 so as to provide an interference fit between the two as spindle 12 is passed through aperture 20. The juncture between spindle sections 28 and 30 form a shoulder 34 which firmly abuts the top surface 15 of bottom wall 14 adjacent aperture 20 when spindle 12 is fully inserted through aperture 20. With spindle section 28 thus acting as a stop to prevent further advancement of spindle 12 through aperture 20, the circular carrier portion 26 lies in a plane spaced and parallel to bottom wall surface 15 which acts to enhance the mechanical connection between carrier member 26 and the hardened button since the liquid monomer 36 will flow beneath and above carrier member 26. The length of spindle section 28 is chosen so that carrier portion 26 is spaced only a small distance from bottom wall surface 15, and is preferably a distance less than half the depth DI of the cup internal cavity 19. Other means may be employed to enhance the mechanical connection between block 12 and button 38, either alternately or in addition to the spacing of carrier member 26 above bottom wall 14.

Figure 3:
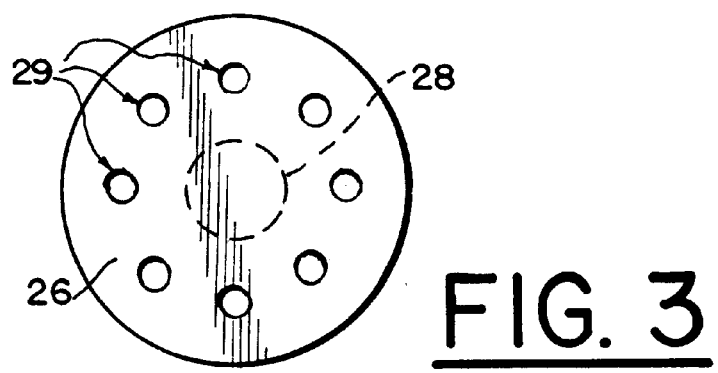
FIG. 3 is a top plan view of the base curve block of the invention according to the embodiment in FIG. 1.

With spindle portion 24 thus fully inserted through aperture 20 as described above, aperture 20 is effectively sealed by spindle section 24 such that a quantity of liquid monomer 36 may be dispensed into cavity 19 with no appreciable leakage through aperture 20 (FIG. 2). As seen best in FIG. 3, additional carrier member to monomer mechanical securing means take the form of a plurality of apertures 29 formed entirely therethrough in annularly spaced relation thereabout. As such, the liquid monomer 36 passes through these apertures 29, as well as between carrier portion 26 and bottom wall surface 15 thereby firmly securing block 12 to the finished button 38 (FIGS. 4 and 5) as the monomer 36 cures. Alternately, a series of cuts could be made into the surface of carrier member 26 to increase the surface area to which the monomer may bond. Alternately, FIG. 6 illustrates yet another embodiment of the block. In FIG. 6, the spindle portion of base curve block 112 may be essentially the same as the embodiment shown in FIG. 3, however, the carrier member 126 includes projections 125 spaced about its periphery to facilitate securing cured monomer to carrier member 126.

Once the monomer 36 has completely cured, pushing upward on free end 22 of spindle 24 toward bottom wall 14 of cup 10 ejects button 38 from cup 10 along with spindle 24 whose sections 30 and 32 pass back through aperture 20 in the direction opposite to which they were inserted. In this regard, it is noted cup 10 may be made flexible to facilitate ejection of button 38 and block 12 therefrom.

It is further noted that instead of passing spindle 20 through an aperture formed in the bottom wall of cup 10, block 12 could be suspended upside down with carrier member 26 located in the top half of cup 10 until the monomer is fully set.

Figure 4:
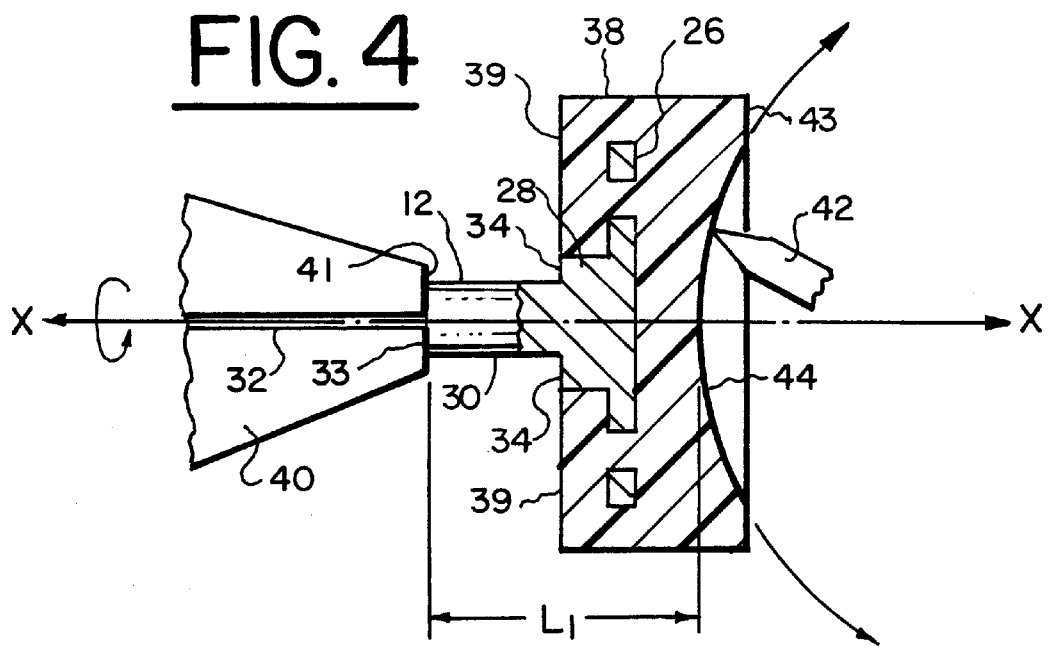
FIG. 4 is a side elevational view in section showing the cured button and base curve block combination from FIG. 2 secured to a lathe chuck with a cutting tool (both fragmented) positioned for cutting the base curve in the button.
Figure 5:
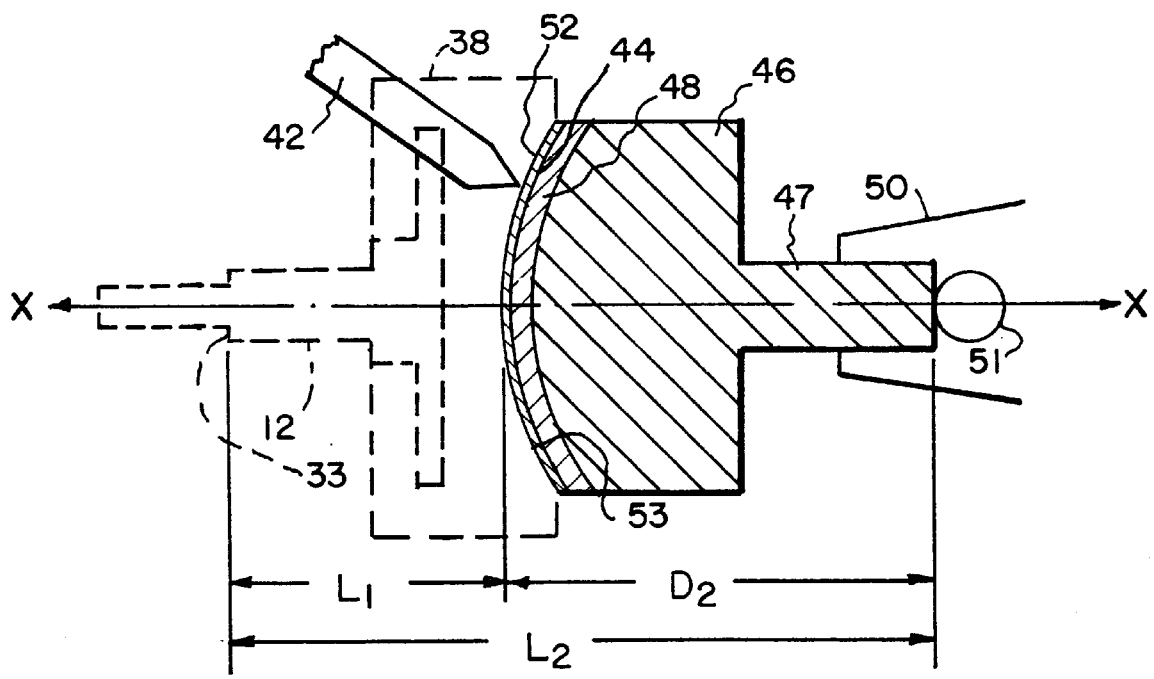
FIG. 5 is a side elevational view of the button and base curve block removed from the base curve lathe of FIG. 4 and mounted to a front curve block attached to a dead-stop chuck, with the cutting tool shown positioned for cutting the power curve of the lens through the base curve block.
Figure 6:
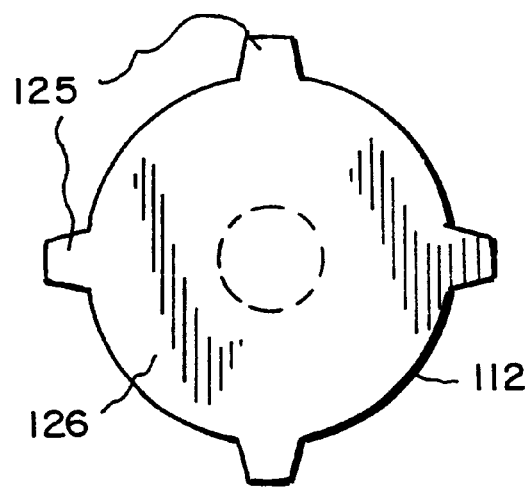
FIG. 6 is a top plan view of the base curve block of the invention according to a second embodiment.

Referring now primarily to FIGS. 4 and 5, it is seen that the bottom surface 39 of button 38 is substantially coplanar with shoulder 34, with spindle sections 30 and 32 extending perpendicularly from the center of bottom button surface 39. Smallest diameter section 32 having free end 22 is configured for releasable attachment to a chuck 40 of a lathe machine(not shown). When fully inserted in the chuck 40, shoulder 33 of spindle 12 (formed at the juncture of sections 30 and 32) firmly abuts the end surface 41 of the chuck 40. As the button 38 and spindle 12 are turned by chuck 40 of the lathe, a cutting tool 42 is applied to top button surface 43 to cut the concave base curve 44 in button 38. It is noted that section 30 or 32 may include a keyway or analogous structure for registering the rotational position of block/button assembly with respect to chuck 40 of the lathe; this is useful when cutting rotationally asymmetric curves into the button. If desired, a polishing operation may be performed on surface 44 at this time either while still attached to chuck 40, or transferred to a polishing station having a separate chuck for turning the workpiece.

As mentioned above, spindle 24 defines the axis x—x about which button 38 is turned as the base curve 44 is cut. This axis x—x substantially coincides with the true central longitudinal axis of button 38 since aperture 20 is formed at substantially the center of bottom wall 14 of cup 10 which forms button 38.

Referring now to FIG. 5, button 38 is shown attached to another lathe for cutting of the front power curve of the lens. However, prior to attaching button 38 to the front curve block 46, a first measurement $L_1$ is taken from spindle juncture 33 to the lowest point 45 of base curve surface 44. Conventional front curve block 46 is then affixed with pitch 48 to the base curve 44 of button 38 while maintaining axial alignment with axis x—x. The free end of spindle 47 is inserted and removably secured into a dead-stop chuck 50 of a lathe (not shown). A second measurement $L_2$ is then taken from the internal stop 51 of chuck 50 to spindle juncture 33; $L_2 - L_1$ thus gives the distance $D_2$ from stop 51 to base curve surface point 45. The lathe may then be programmed to cut the front power curve 52 to the desired thickness as measured out from base curve point 45. It is noted that any other predetermined point on spindle 20 may be chosen from which the measurements are taken (e.g., the free end 22 thereof).

Thus, while block 46 and button 38 (including integral base curve block 12) are rotated in chuck 50, cutting tool 42 is brought across button 38 which completely cuts away base curve block 12 and that portion of button 38 shown in dotted lines. This cutting operation may be prior to or simultaneous with the cutting of the convex power surface 52. Subsequent lens edging and polishing operations (not shown) may be performed on the cut lens 53 as desired, followed by removal of the finished lens from front curve block 46 using known methods.

The above-described preferred embodiment relates primarily to methods involving molding, and subsequently lathing, a contact lens button having a cylindrical shape and integrated with a block for removable attachment to a lathe chuck. However, the invention is also applicable to methods involving molding, and subsequently lathing, a semi-finished contact lens button, i.e., methods where a contact lens button is first molded integral with the block so as provide a semi-finished button with one lens surface, and subsequently the opposite surface of the button is lathed to obtain an article with a final contact lens shape.

Figure 7:
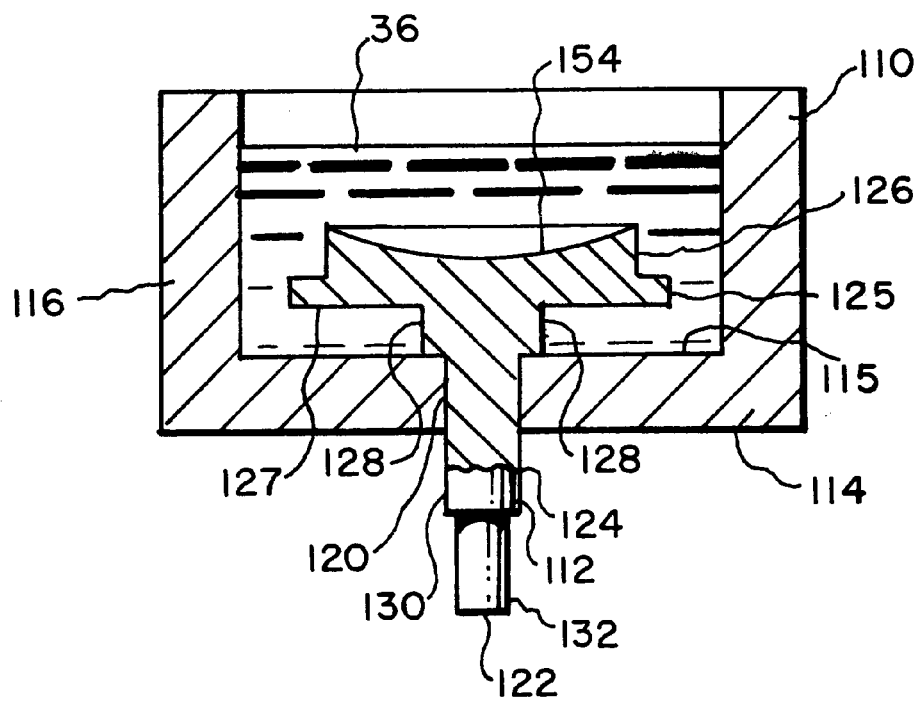
FIG. 7 is a side elevational view in section of the casting cup and block in the attached condition according to a second embodiment.

Accordingly, FIG. 7 is a side elevational view in section of the casting cup and block for casting a semi-finished button having a "molded-in" front surface. In this embodiment, casting cup 110 may have the same general construction as cup 10 in the previously described embodiments, including a generally circular bottom wall 114, with aperture 120 formed entirely therethrough, and a cylindrical side wall 116. Block 112 may be formed of materials as desired for block 12.

Block 112 comprises a spindle portion 124 and an integral circular carrier portion 126, with spindle portion 124 perpendicularly extending from substantially the center of the bottom surface 127 thereof. Spindle 24 preferably is configured with three sections 128, 130 and 132 of increasingly reduced diameter from bottom surface 27 to the spindle free end 122, respectively. Center section 124 provides an interference fit with aperture 120, with spindle section 128 acting as a stop to prevent further advancement of spindle 112 through aperture 120. The bottom surface 127 of carrier member 126 lies in a plane spaced and parallel to bottom wall surface 115, such that liquid monomer 36 can fill this space between surface 127 and carrier member 126 when dispensed in the cavity of cup 110. Projections 125 are adequately spaced from the inner surfaces of cup cylindrical wall 116 to permit liquid monomer 36 to fill this space, it being further noted that liquid monomer can flow between interstices between individual projections 125. As discussed previously with reference to FIG. 6, projections 125 facilitate securing cured monomer to carrier member 126.

For this described embodiment, carrier member 126 of block 112 includes upper concave surface 154 which has the desired shape of the front contact lens surface.

Accordingly, when monomer 36 is cured, the resultant button includes a convex molded-in front surface formed against surface 154, whereby it is unnecessary to lathe cut the front lens surface. As in the previous embodiments, this semi-finished button is secured to block 112 for a subsequent lathing operation of the back lens surface. Surface 154 may be spherical, aspherical or toric and may include multiple curves as in conventional front surface contact lens designs.

After removing the button and block assembly from cup 110, section 132 may be inserted into the chuck of a lathe mechanism for cutting the back lens surface (base curve) from the button. If desired, some excess cured lens material can be removed before cutting the back lens surface, so long as the button remains secured to block 112. The depth of the cut for the back lens surface is controlled to ensure desired thickness across the surface of the lens. Then, a desired lens edge profile can be cut to form the final lens-shaped article, followed by removal of the finished lens from block 112. (Alternately, surface 154 may be shaped so as to form a contact lens edge portion when monomer is cured, thus eliminating or partially eliminating the need to lathe the edge profile.)

Figure 8:
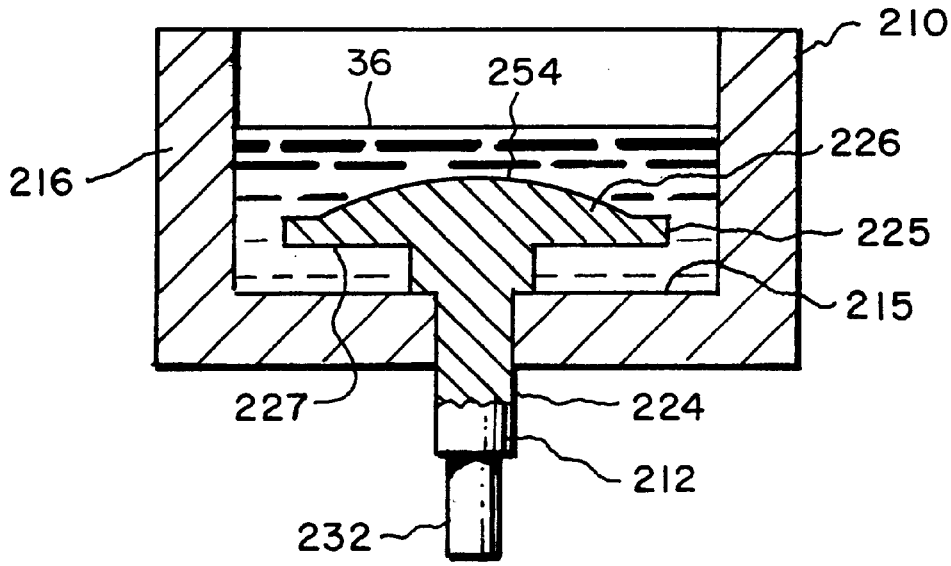
FIG. 8 is a side elevational view in section of the casting cup and block in the attached condition according to a third embodiment.

FIG. 8 illustrates another embodiment for initially molding a semi-finished button. In this embodiment, casting cup 210 may have the same general construction as in the previously described embodiments. Block 212 may be formed of materials as desired for block 12 or block 112.

Block 212 similar comprises a spindle portion 224 and an integral circular carrier portion 226, with spindle portion 224 perpendicularly extending from substantially the center of the bottom surface 227 thereof. The bottom surface 227 of carrier member 226 is spaced from and parallel to bottom wall surface 215, such that liquid monomer 36 can fill this space between surface 227 and carrier member 226 when dispensed in the cavity of cup 210. Projections 225 are included on carrier member 226, as in other embodiments, and adequately spaced from the inner surfaces of cup cylindrical wall 216 to permit liquid monomer 36 to fill this space.

For this described embodiment, carrier member 226 of block 212 includes upper convex surface 254 which has the desired shape of the back contact lens surface. Accordingly, when monomer 36 is cured, the resultant button includes a concave molded-in back surface formed against surface 254, whereby it is unnecessary to lathe cut the back lens surface. As in the previous embodiments, this semi-finished button is secured to block 212 for a subsequent lathing operation of the front lens surface. Surface 254 may be spherical, aspherical or toric and may include multiple curves as in conventional back surface contact lens designs, and optionally, surface 254 may be shaped so as to form a contact lens edge portion when monomer is cured.

After removing the button and block assembly from cup 210, section 232 may be inserted into the chuck of a lathe mechanism for cutting the front lens surface (power curve) from the button. If desired, some excess cured lens material may be removed from the button prior to cutting the front lens surface. The depth of the cut for the front lens surface is controlled to ensure desired thickness across the surface of the lens. Then, a desired lens edge profile can be cut to form the final lens-shaped article, followed by removal of the finished lens from block 212.

Figure 9:
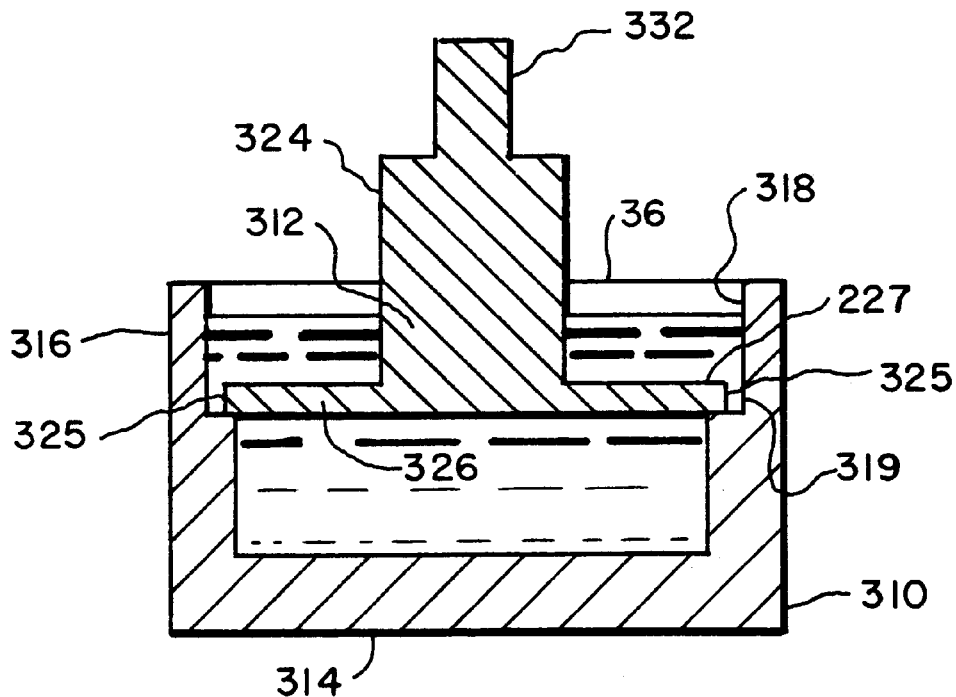
FIG. 9 is a side elevational view in section of the casting cup and block in the attached condition according to yet another embodiment.

FIG. 9 illustrates yet another embodiment of the invention. Casting cup 310 includes a generally circular bottom wall 314 and a cylindrical side wall 316. This embodiment is particularly useful where casting cup 310 is made of a plastic having sufficient transparency so that monomer 36 can be cured by exposure to an ultraviolet light source positioned below bottom wall 314, i.e., ultraviolet light is transmitted through bottom wall 314 to monomer 36 containing in casting cup 310.

Block 312 may be formed of materials as desired for block 12. Block 312 comprises a spindle portion 324 and an integral circular carrier portion 326 that includes projections 325 (analogous to the embodiment shown in FIG. 6), with spindle portion 324 perpendicularly extending from substantially the center of the upper surface 227 of the carrier portion. Spindle 324 preferably includes section 332 and is engageable with a lathe chuck. Individual projections 325 are spaced with interstices (as shown in FIG. 6) so that monomer 36 can be flow below carrier member 326. As discussed previously with reference to FIG. 6, projections 325 facilitate securing cured monomer to carrier member 126. The inner surface of cup cylindrical side wall 316 include a detente 318, forming shoulder 319, so that projections 325 can rest on shoulder 319 while liquid monomer 36 is introduced into and then cured in the casting cup.

As in the previously described embodiments, curing of monomer 36 results in the button being secured to block 312, and the spindle portion of 312 can be mounted in a lathe chuck for machining operations.

Various alternate embodiments of the present invention are evident, and other variations and embodiments will be evident to one skilled in the art.

What is claimed is:

1. A method of forming a contact lens button with an integral block for removably attaching said button to a lathe chuck, said method comprising the steps of:

a) providing a cup having an internal cavity;
 b) dispensing a predetermined amount of liquid lens material in said cavity;
 c) providing a block formed of a machinable resin having first and second, opposite end portions, said first end portion configured for removable attachment to a lathe chuck;
 d) positioning said second end portion of said block in said liquid lens material with said first end portion extending exteriorly of said cavity; and
 e) curing said liquid lens material to form said button which is fixedly secured to said block, said button and said block removable as a single unit from said cup for subsequent attachment of said block first end portion to a lathe chuck.

2. The method of claim 1 wherein said block is formed from polystyrene.

3. The method of claim 1 wherein said cup includes a bottom wall having an aperture formed therein and wherethrough said block extends with said first end portion thereof positioned exteriorly of said cup and said second end portion thereof positioned in said internal cavity of said cup.

4. The method of claim 3 wherein said cup bottom wall is substantially circular and said aperture is located in substantially the center of said bottom wall.

5. The method of claim 1 wherein said block first end portion is elongated and said block second end portion is of substantially planar configuration and lies substantially perpendicular to said first end portion.

6. The method of claim 5 herein said block second end portion includes a plurality of apertures wherethrough said liquid lens material flows and subsequently solidifies during curing.

7. The method of claim 5 wherein said block first end portion comprises a spindle having a first section of maximum diameter extending from said block second end portion, and a second section having a diameter less than said first section, said second section linearly extending from said first section and forming a shoulder at the juncture of said first and second spindle sections, said second section having a free end opposite said first section for removable insertion in said lathe chuck.

8. The method of claim 7 wherein said cup includes a bottom wall having an aperture formed therein and wherethrough said block extends with said first end thereof positioned exteriorly of said cup and said second end thereof positioned in said internal cavity of said cup.

9. The method of claim 8 wherein said cup bottom wall is substantially circular and said aperture is located in substantially the center of said bottom wall.

10. The method of claim 8 wherein said diameter of said spindle second section is slightly smaller than the diameter of said aperture such that said spindle section has an interference fit with said aperture when said spindle is inserted through said aperture.

11. The method of claim 10 wherein said spindle first section is located interiorly of said cup with said block second end portion lying in a plane spaced above said cup bottom wall, and said spindle second section lies exteriorly of said cup with said juncture abutting said aperture interiorly of said cup when said block is attached to said cup.

12. The method of claim 1 and further comprising the steps of:

f) removing said solid contact lens button and said block from said cup;
 g) releasably securing said block first end portion in a lathe chuck; and h) lathing a concave base curve in the surface of said contact lens button located opposite said block.

13. The method of claim 12, and further comprising the step of measuring a first length $L_1$ from said base curve to a predetermined location on said block first end portion.

14. The method of claim 13, and further comprising the steps of:
   a) removably securing a front curve block to said base curve surface;
   b) removably inserting said front curve block in a lathe chuck; and
   c) measuring a second length $L_2$ from a predetermined location on said chuck to said predetermined location on said block first end portion.

15. The method of claim 1, wherein said cup is formed from polypropylene.

16. The method of claim 1, wherein said cup is made from a material which can be flexed to facilitate removal of said button and block from said cup.

17. The method of claim 1, wherein said block second end portion has a substantially planar bottom surface and a substantially planar top surface, the block first end portion extending perpendicular from the second end portion bottom surface.

18. The method of claim 1, wherein said block second end portion has a substantially planar bottom surface and a convex top surface, the block first end portion extending perpendicular from the second end portion bottom surface.

19. The method of claim 1, wherein said block second end portion has a substantially planar bottom surface and a concave top surface, the block first end portion extending perpendicular from the second end portion bottom surface.

20. The method of claim 1, wherein said block second end portion includes projections extending from the circumference thereof.

21. The method of claim 14, and further comprising the steps of:
   d) subtracting $L_1$ from $L_2$ to find the distance $D_2$ from said base curve surface to said predetermined location on said chuck; and
   e) cutting a convex front curve in the surface of said button opposite said base curve while simultaneously cutting away said machinable block.

* * * * *

UNITED STATES PATENT AND TRADEMARK OFFICE
CERTIFICATE OF CORRECTION

PATENT NO. : 5,972,251
DATED : October 26, 1999
INVENTOR(S) : Shannon

It is certified that error appears in the above-identified patent and that said Letters Patent is hereby corrected as shown below:

column 8, line 30, change "herein" to --wherein--.

Signed and Sealed this

Twenty-fifth Day of July, 2000

Attest:

Q. TODD DICKINSON

Attesting Officer

Director of Patents and Trademarks